United States Patent
Zwicky et al.

(10) Patent No.: US 11,912,274 B2
(45) Date of Patent: Feb. 27, 2024

(54) ADAPTIVE CRUISE CONTROL WITH NON-VISUAL CONFIRMATION OF OBSTACLES

(71) Applicant: Ford Global Technologies, LLC, Dearborn, MI (US)

(72) Inventors: Timothy D. Zwicky, Dearborn, MI (US); Jeremy Lerner, Southfield, MI (US); Xingping Chen, Troy, MI (US); Dina Tayim, Dearborn, MI (US); Ryan Jones, Canton, MI (US); Taylor Hawley, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 17/307,174

(22) Filed: May 4, 2021

(65) Prior Publication Data

US 2022/0355794 A1    Nov. 10, 2022

(51) Int. Cl.
*B60W 30/14* (2006.01)
*B60W 50/14* (2020.01)
*B60W 30/09* (2012.01)

(52) U.S. Cl.
CPC .......... *B60W 30/143* (2013.01); *B60W 30/09* (2013.01); *B60W 50/14* (2013.01);
(Continued)

(58) Field of Classification Search
CPC ......... B60W 2420/42; B60W 2420/52; B60W 2552/05; B60W 2554/20; B60W 2554/406; B60W 2554/801; B60W 2554/802; B60W 2556/10; B60W 2556/65; B60W 2710/18; B60W 30/09; B60W 30/143; B60W 30/18154; B60W 50/14; B60W 2554/4041; B60W 30/18018; B60W 40/04; B60W 40/105; B60W 50/0097;
(Continued)

(56) References Cited

U.S. PATENT DOCUMENTS 6,832,156 B2   12/2004  Farmer
8,791,802 B2    7/2014  Schwindt et al.
(Continued)

FOREIGN PATENT DOCUMENTS

| CN | 109204311 A | * | 1/2019 | ............ B60W 30/09 |
| CN | 111712829 A |   | 9/2020 | |
| EP | 3070700 A1 | * | 9/2016 | .......... B60W 30/095 |

*Primary Examiner* — Babar Sarwar
(74) *Attorney, Agent, or Firm* — Frank A. MacKenzie; Bejin Bieneman PLC

(57) ABSTRACT

A system comprises a computer having a processor and a memory, the memory storing instructions executable by the processor to access sensor data of a first sensor of a vehicle while an adaptive cruise control feature of the vehicle is active, detect, based on the sensor data of the first sensor, a stationary object located along a path of travel of the vehicle, wherein the stationary object is located outside of a range of a second sensor of the vehicle, determine a presence of an intersection within a threshold distance of the stationary object that is along the path of travel of the vehicle, and responsive to a determination that the stationary object is a stopped vehicle of the intersection, adjust, by the adaptive cruise control feature, the speed of the vehicle.

20 Claims, 10 Drawing Sheets

(52) U.S. Cl.
CPC ..... *B60W 2420/42* (2013.01); *B60W 2420/52* (2013.01); *B60W 2552/05* (2020.02); *B60W 2554/20* (2020.02); *B60W 2554/406* (2020.02); *B60W 2554/801* (2020.02); *B60W 2554/802* (2020.02); *B60W 2556/10* (2020.02); *B60W 2556/65* (2020.02); *B60W 2710/18* (2013.01)

(58) Field of Classification Search
CPC ... B60W 2050/0088; B60W 2554/402; B60W 2555/60; B60W 30/16; B60W 30/17; B60W 30/181; G01G 19/22; G01G 19/62; G01G 23/007; G01G 23/14; G01G 23/18; G06Q 50/10; G08C 17/02; G06V 20/58
See application file for complete search history.

(56) References Cited

U.S. PATENT DOCUMENTS

| | | | |
|---|---|---|---|
| 9,453,910 B2 | 9/2016 | Elwart et al. | |
| 9,557,736 B1* | 1/2017 | Silver | G08G 1/09626 |
| 10,133,275 B1* | 11/2018 | Kobilarov | B60W 60/0016 |
| 10,489,663 B2* | 11/2019 | Olson | G06V 20/56 |
| 10,671,076 B1* | 6/2020 | Kobilarov | G08G 1/166 |
| 11,380,194 B2* | 7/2022 | Sze | G08G 1/09623 |
| 11,590,965 B2* | 2/2023 | Sugano | B62D 15/0285 |
| 2008/0275618 A1 | 11/2008 | Grimm et al. | |
| 2013/0110316 A1* | 5/2013 | Ogawa | G08G 1/096725 701/1 |
| 2014/0336898 A1* | 11/2014 | Schwindt | B60W 30/14 701/96 |
| 2015/0210312 A1* | 7/2015 | Stein | G05D 1/0246 701/41 |
| 2016/0318490 A1* | 11/2016 | Ben Shalom | B60W 30/18109 |
| 2017/0287338 A1* | 10/2017 | Neubecker | H04W 4/46 |
| 2018/0362036 A1* | 12/2018 | Liles | B60W 50/14 |
| 2019/0250626 A1* | 8/2019 | Ghafarianzadeh | B60K 31/0008 |
| 2019/0258268 A1* | 8/2019 | Macneille | G05D 1/0287 |
| 2021/0024063 A1* | 1/2021 | Luo | G06V 20/58 |
| 2021/0026360 A1* | 1/2021 | Luo | G06N 20/00 |
| 2021/0107476 A1* | 4/2021 | Cui | B60W 60/00276 |
| 2021/0291831 A1* | 9/2021 | Rossi | B60W 10/10 |
| 2021/0291861 A1* | 9/2021 | Jiao | H04W 4/46 |
| 2022/0063655 A1* | 3/2022 | Clasen | B60W 60/001 |
| 2022/0153266 A1* | 5/2022 | Muyshondt | B60W 40/04 |
| 2022/0153273 A1* | 5/2022 | Metli | B60W 30/18154 |
| 2022/0242408 A1* | 8/2022 | Namba | B60W 30/146 |

* cited by examiner

500

ADAPTIVE CRUISE CONTROL WITH NON-VISUAL CONFIRMATION OF OBSTACLES

BACKGROUND

Adaptive cruise control is a vehicle feature that, when engaged, controls vehicle propulsion power/acceleration in order to maintain a set speed when possible, while monitoring the road in front of the vehicle in order to detect other vehicles that may be present. When the adaptive cruise control feature detects the presence of a slower-moving vehicle in front of the controlled vehicle, it can temporarily reduce the speed of the controlled vehicle below the set speed in order to maintain a desired minimum following distance. Subsequently, if the adaptive cruise control feature detects that the road in front of the vehicle has become clear, it can cause the vehicle to accelerate back up to the set speed.

DETAILED DESCRIPTION

Figure 1:
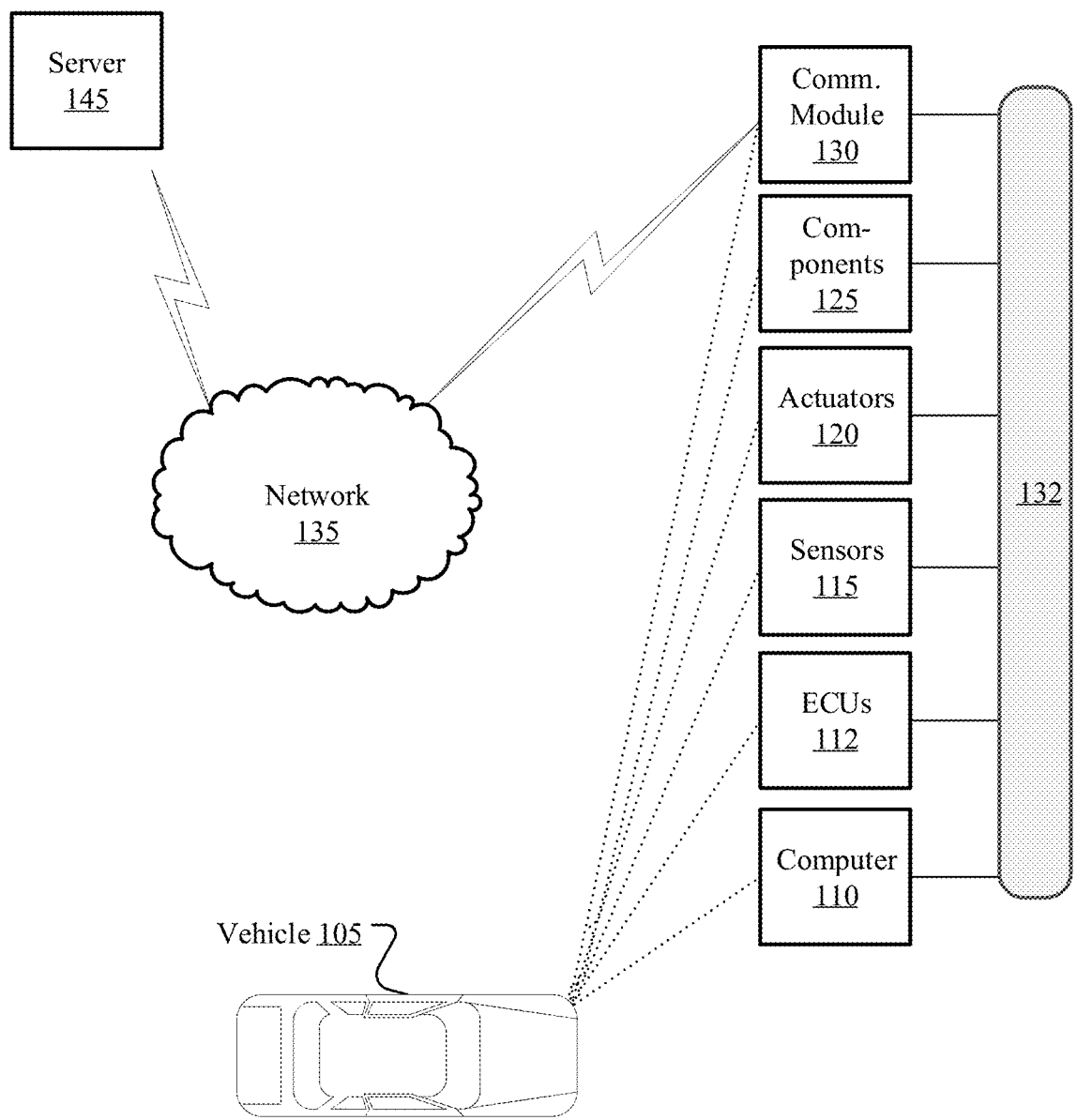
FIG. 1 is a block diagram of a first example system.

Disclosed herein are adaptive cruise control improvements according to which visual confirmations for radar-detected stationary objects can be selectively ignored in situations where they are likely to be counterproductive. The proximity of a radar-detected stationary object to an intersection can be recognized both as an indication that it is undesirable to require visual confirmation that the stationary object is an obstacle in the path of travel of a host vehicle, and as a form of non-visual confirmation that the stationary object is such an obstacle. In some implementations, knowledge of traffic conditions and/or traffic signal states at an intersection can be obtained from data provided by nearby vehicles and/or infrastructure, and can serve as a basis for a context-appropriate decision regarding whether the detected stationary object is a stopped vehicle constituting an obstacle in the path of travel of a host vehicle.

A system can comprise a computer having a processor and a memory, the memory storing instructions executable by the processor to access sensor data of a first sensor of a vehicle while an adaptive cruise control feature of the vehicle is active, detect, based on the sensor data of the first sensor, a stationary object located along a path of travel of the vehicle, wherein the stationary object is located outside of a range of a second sensor of the vehicle, determine a presence of an intersection within a threshold distance of the stationary object that is along the path of travel of the vehicle, and responsive to a determination that the stationary object is a stopped vehicle of the intersection, adjust, by the adaptive cruise control feature, the speed of the vehicle.

The memory can store instructions executable by the processor to determine the threshold distance based on at least one of current traffic conditions of the intersection and historical traffic conditions of the intersection.

The memory can store instructions executable by the processor to determine that the stationary object is the stopped vehicle based on received intersection data, wherein the received intersection data includes at least one of intersection data obtained via a wireless vehicle-to-vehicle (V2V) communication link and intersection data obtained via a wireless vehicle-to-infrastructure (V2X) communication link.

The received intersection data can include at least one of traffic condition data for the intersection and traffic signal state data for the intersection.

The memory can store instructions executable by the processor to access vehicle tracking data identifying a set of previously-detected vehicles, identify, among the set of previously-detected vehicles, based on the sensor data of the first sensor, one or more previously detected vehicles that are present in lanes adjacent to a lane of the stationary object, determine whether the one or more previously detected vehicles are stationary, and responsive to a determination that the one or more previously detected vehicles are stationary, determine that the stationary object is the stopped vehicle of the intersection.

The memory can store instructions executable by the processor to determine that the stationary object is the stopped vehicle based on crowdsourced false obstacle data received from a remote server.

The memory can store instructions executable by the processor to generate an alert for presentation by a human-machine interface (HMI) of the vehicle responsive to the determination that the stationary object is the stopped vehicle.

The memory can store instructions executable by the processor to apply vehicle braking of the vehicle responsive to the determination that the stationary object is the stopped vehicle.

The first sensor can be a radar sensor, and the second sensor can be a camera.

The first sensor can be a camera, and the second sensor can be a radar sensor.

A method can comprise accessing sensor data of a first sensor of a vehicle while an adaptive cruise control feature of the vehicle is active, detecting, based on the sensor data of the first sensor, a stationary object located along a path of travel of the vehicle, wherein the stationary object is located outside of a range of a second sensor of the vehicle, determining a presence of an intersection within a threshold distance of the stationary object that is along the path of travel of the vehicle, and responsive to a determination that the stationary object is a stopped vehicle of the intersection, adjusting, by the adaptive cruise control feature, the speed of the vehicle.

The method can comprise determining the threshold distance based on at least one of current traffic conditions of the intersection and historical traffic conditions of the intersection.

The method can comprise determining that the stationary object is the stopped vehicle based on received intersection data, wherein the received intersection data includes at least one of intersection data obtained via a wireless vehicle-to-vehicle (V2V) communication link and intersection data obtained via a wireless vehicle-to-infrastructure (V2X) communication link.

The received intersection data can include at least one of traffic condition data for the intersection and traffic signal state data for the intersection.

The method can comprise accessing vehicle tracking data identifying a set of previously-detected vehicles, identifying, among the set of previously-detected vehicles, based on the sensor data of the first sensor, one or more previously detected vehicles that are present in lanes adjacent to a lane of the stationary object, determining whether the one or more previously detected vehicles are stationary, and responsive to a determination that the one or more previously detected vehicles are stationary, determining that the stationary object is the stopped vehicle of the intersection.

The method can comprise determining that the stationary object is the stopped vehicle based on crowdsourced false obstacle data received from a remote server.

The method can comprise generating an alert for presentation by a human-machine interface (HMI) of the vehicle responsive to the determination that the stationary object is the stopped vehicle.

The method can comprise applying vehicle braking of the vehicle responsive to the determination that the stationary object is the stopped vehicle.

The first sensor can be a radar sensor, and the second sensor can be a camera.

The first sensor can be a camera, and the second sensor can be a radar sensor.

FIG. 1 is a block diagram of a first example system 100. The system 100 includes a host vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, and a vehicle network 132. Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. Any given ECU 112 can include a processor and a memory. The memory can include one or more forms of computer-readable media, and can store instructions executable by the processor for performing various operations, including as disclosed herein. The processor of any given ECU 112 can be implemented using a general-purpose processor or a dedicated processor or processing circuitry, including any of the examples identified above in reference to a processor included in computer 110.

In some implementations, the processor of a given ECU 112 can be implemented using a microcontroller. In some implementations, the processor of a given ECU 112 can be implemented using a dedicated electronic circuit including an ASIC that is manufactured for a particular operation, e.g., an ASIC for processing sensor data and/or communicating the sensor data. In some implementations, the processor of a given ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a given ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2X) wireless communications to another vehicle, to (typically via the network 135) a remote server 145. The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC) and cellular V2V (CV2V), cellular V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
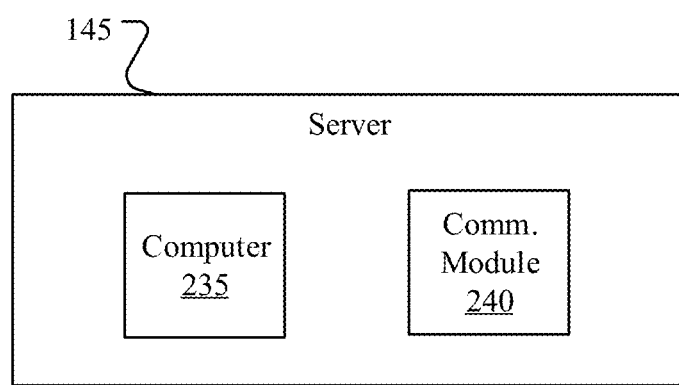
FIG. 2 is a block diagram of an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 can include conventional mechanisms for wired and/or wireless communications, e.g., radio frequency communications using suitable protocols, that allow computer 235 to communicate with other devices, such as the vehicle 105, via wireless and or wired communication networks/links.

Figure 3A:
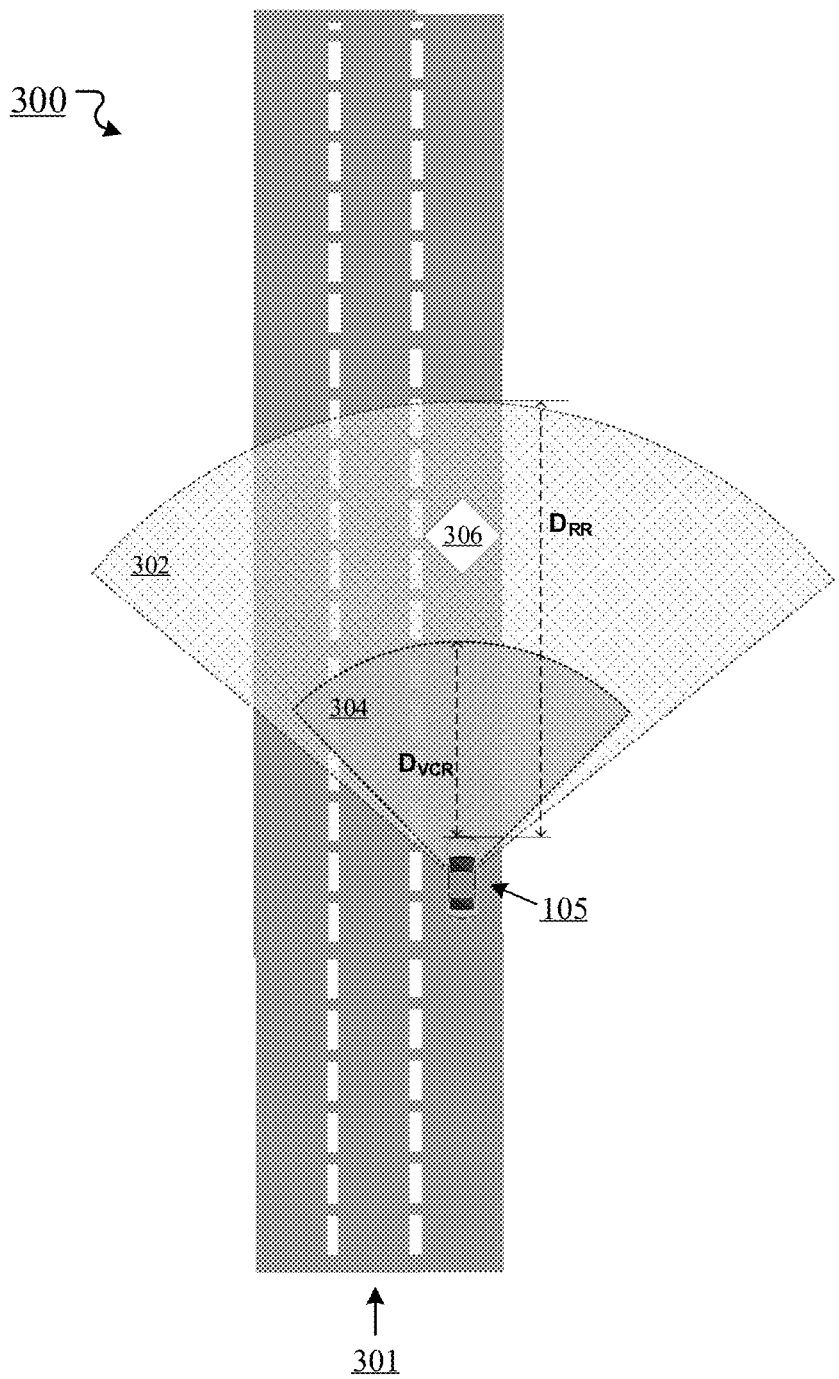
FIG. 3A is a diagram of a first example traffic scene.

FIG. 3A is a diagram of a first example traffic scene 300. In traffic scene 300, while an adaptive cruise control feature of vehicle 105 is engaged, vehicle 105 travels a roadway 301. While engaged, the adaptive cruise control feature of vehicle 105 can control vehicle propulsion power/acceleration in order to maintain a set speed when possible, while monitoring the road in front of vehicle 105 in order to detect other vehicles that may be present. When the adaptive cruise control feature detects the presence of a vehicle in front of vehicle 105, it can determine whether vehicle 105, if it continues to travel at the set speed, will approach to within a desired minimum following distance from the detected vehicle. If so, the adaptive cruise control feature can temporarily reduce the speed of vehicle 105 below the set speed in order to prevent it from approaching any closer than the desired minimum following distance.

The adaptive cruise control feature of vehicle 105 can use data provided by radar sensor(s) and camera(s) of vehicle 105 in order to detect the presence of other vehicles on roadway 301. Using radar sensing data provided by radar sensor(s) of vehicle 105 (e.g., radar sensor(s) among sensors 115), radar-based object detection functionality of vehicle 105 (e.g., radar-based object detection functionality provided by computer 110 or an ECU 112) can detect objects (such as other vehicles) within a radar range 302 that extends a distance $D_{RR}$ forward from the front of vehicle 105. Using images captured by camera(s) of vehicle 105 (e.g., camera(s) among sensors 115), image-based object detection functionality of vehicle 105 (e.g., image-based object detection functionality provided by computer 110 or an ECU 112) can visually detect/recognize objects (such as other vehicles) within a visual confirmation range 304. Visual confirmation range 304, which is smaller than radar range 302, extends a distance $D_{VCR}$ forward from the front of vehicle 105, where $D_{VCR}$ is less than $D_{RR}$.

The adaptive cruise control feature of vehicle 105 can be configured to obtain visual confirmation that objects detected via radar actually constitute obstacles in the travel path of vehicle 105 prior to performing adaptive cruise control state adjustments (e.g., deceleration) in response to the detection of such objects. As employed herein, the term "visual confirmation" means confirmation (of a hypothesis) that is realized via processing/analysis of captured images. When radar-based object detection functionality of vehicle 105 detects an object, image-based object detection functionality of vehicle 105 can provide visual confirmation of a hypothesis that the object is an obstacle in the travel path of vehicle 105 by analyzing captured images to determine whether they contain evidence of an object in the travel path of vehicle 105 that is consistent with the radar sensing data that served as the basis for the radar-based detection of the object.

In traffic scene 300, an object 306—which may represent another vehicle or may represent some other object—is located along the travel path (the right lane of roadway 301) of vehicle 105. Object 306 is located within radar range 302 of vehicle 105, and thus can be detected using radar. However, object 306 is located outside of visual confirmation range 304. Thus, the adaptive cruise control feature of vehicle 105 cannot visually confirm that object 306 constitutes an obstacle in the travel path of vehicle 105 (as opposed to, e.g., an overpass, low-clearance bridge, or other structure above roadway 301, or objects on or near the roadway, such as a bridge support pillar). If it is required to obtain visual confirmation before adjusting adaptive cruise control parameters, the adaptive cruise control feature of vehicle 105 will not react to the presence of object 306 until vehicle 105 advances to within camera range of object 306.

Requiring visual confirmation of the presence and identity/nature of radar-detected objects before adjusting adaptive cruise control parameters (e.g., reducing vehicle speed) to account for such objects can beneficially impact adaptive cruise control performance. For instance, radar returns from stationary objects in the vicinity of the roadway (e.g., guardrails, bridges, overpasses, etc.) can falsely suggest the presence of vehicles/obstacles on the roadway itself. In such cases, requiring visual confirmation can avoid unnecessary/inappropriate state adjustments (e.g., unnecessary deceleration/braking) that might otherwise result.

Figure 3B:
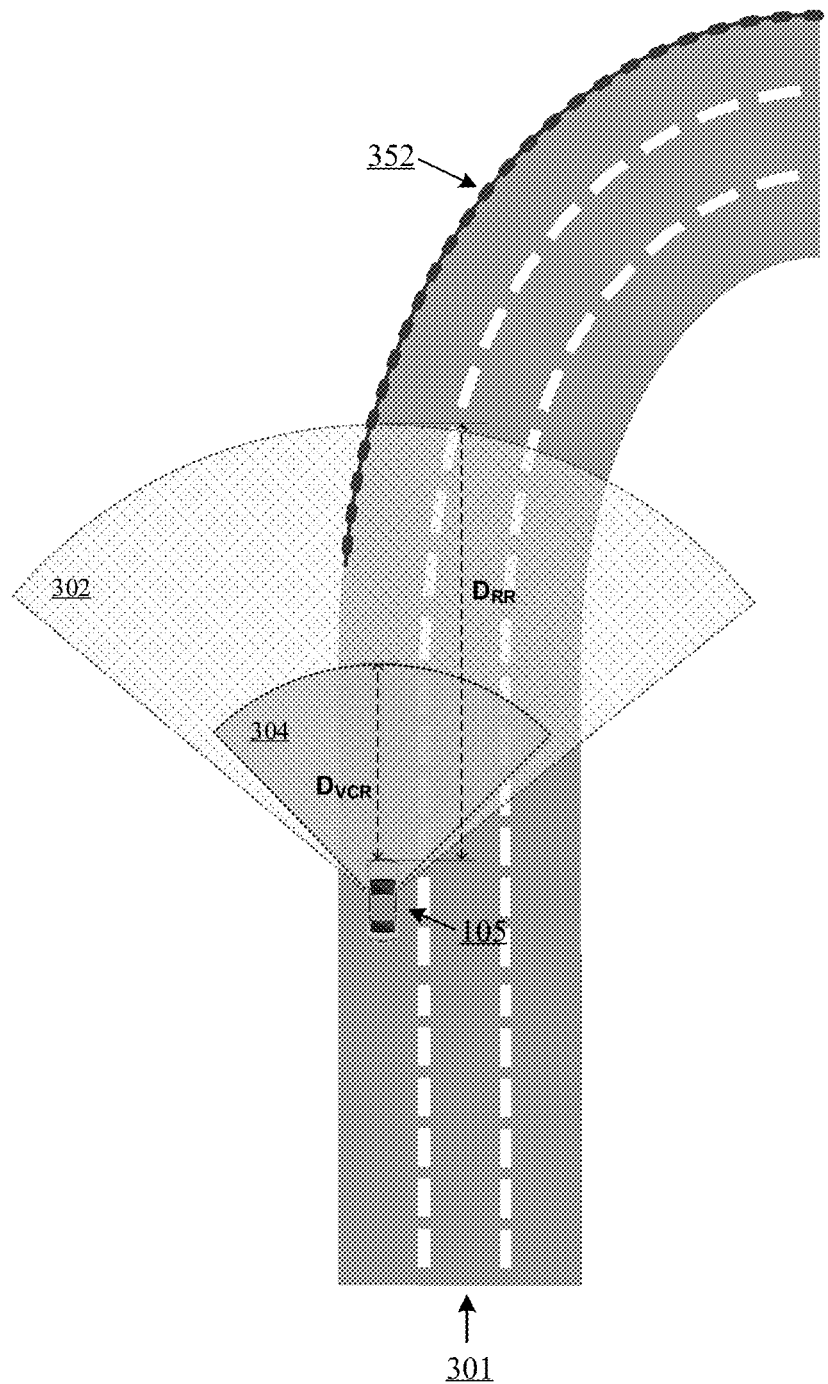
FIG. 3B is a diagram of a second example traffic scene.

FIG. 3B is a diagram of a second example traffic scene 350, in which requiring visual confirmation may beneficially impact adaptive cruise control performance. In traffic scene 350, while its adaptive cruise control feature is engaged, vehicle 105 travels the left lane of roadway 301, and approaches a rightward curve in roadway 301. A guardrail 352 is installed along the left side of roadway 301 in the portion of roadway 301 that comprises the rightward curve. A closest portion of the guardrail 352 is located within radar range 302 of vehicle 105, and may cause radar returns indicating the potential presence of an obstacle in the travel path of vehicle 105. If the adaptive cruise control feature of vehicle 105 is permitted to adjust adaptive cruise control parameters based on those radar returns, without visual confirmation, it may result in undesired behavior, e.g., unnecessarily cause vehicle 105 to decelerate when its travel path is in fact clear. Requiring visual confirmation can enable the adaptive cruise control feature to correctly conclude that no obstacle is actually present in the travel path, and refrain from such unnecessary deceleration.

Although requiring visual confirmation can beneficially impact performance in many situations, such a requirement can potentially have a negative impact on adaptive cruise control performance in certain scenarios. For instance, when stationary objects (e.g., stopped vehicles) are present on the roadway itself, requiring visual confirmation can negatively impact performance by hampering the adaptive cruise control feature's ability to timely adapt to the presence of those stationary objects.

Figure 3C:
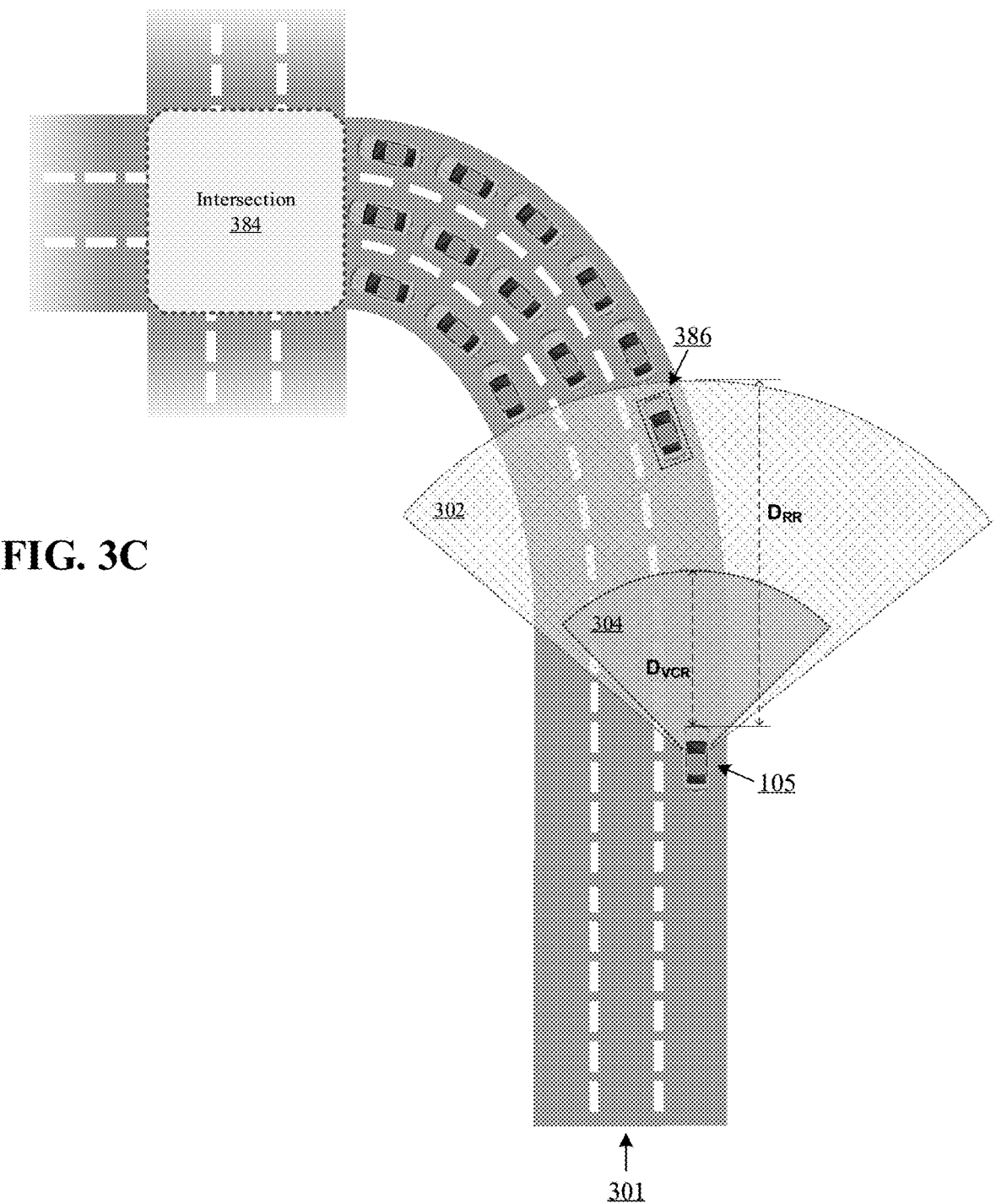
FIG. 3C is a diagram of a third example traffic scene.

FIG. 3C is a diagram of a third example traffic scene 380, which depicts an example of such a scenario. In traffic scene 380, while its adaptive cruise control feature is engaged, vehicle 105 travels the right lane of roadway 301, and approaches an intersection 384 that is preceded by a leftward curve in roadway 301. As employed herein, the term "intersection" means a region of overlap between/among multiple roadways. In the portion of roadway 301 immediately preceding intersection 384, all three lanes are congested with stopped vehicles waiting to traverse intersection 384. The rearmost stopped vehicle in the right lane is a vehicle 386. Vehicle 386 is within radar range 302 of vehicle 105. Based on radar returns from vehicle 386, radar-based object detection functionality of vehicle 105 may detect the presence of a stationary object that potentially constitutes an obstacle in the travel path of vehicle 105. However, vehicle 386 is outside of the visual confirmation range 304 of vehicle 105. Thus, at the present position of vehicle 105, its adaptive cruise control feature may be unable to obtain visual confirmation that the detected stationary object (vehicle 386) actually constitutes an obstacle in the travel path of vehicle 105.

If the adaptive cruise control feature of vehicle 105 is required to obtain such visual confirmation prior to adjusting adaptive control parameters (e.g., causing vehicle 105 to decelerate), it may be unable to take action until vehicle 105 advances to within distance $D_{VCR}$ of vehicle 386 (such that vehicle 386 is within visual confirmation range 304 of vehicle 105). By that time, uncomfortable, harsh, or even drastic deceleration/braking may be necessary in order to maintain a desired minimum following distance/separation from vehicle 386. Thus, in the context of traffic scene 380, it may be preferable that the adaptive cruise control feature not be required to obtain visual confirmation. However, in the context of many other scenarios, such as that reflected in traffic scene 350 of FIG. 3B, the absence of a visual confirmation requirement may give rise to erroneous object detections and may degrade adaptive cruise control performance.

Disclosed herein is an adaptive cruise control system that can recognize situations in which requiring visual confirmation is undesirable, and treat such situations differently than those in which a visual confirmation requirement has a positive impact on adaptive cruise control performance.

According to techniques disclosed herein, proximity of a radar-detected stationary object to an upcoming intersection, i.e., an intersection in a planned travel path of the host vehicle 105, can be recognized both as an indication that it is undesirable to require visual confirmation that the stationary object is an obstacle in the path of travel, and as a form of non-visual confirmation that the stationary object is such an obstacle. In some implementations, the adaptive cruise control feature of vehicle 105 can consult map data to determine whether a radar-detected stationary object is located within a threshold distance of an upcoming intersection. In some implementations, if the radar-detected stationary object is within a threshold distance of an upcoming intersection, the adaptive cruise control feature can conclude that the radar-detected stationary object is a stopped vehicle of the upcoming intersection, and that visual confirmation is not to be required.

In some implementations, the threshold distance can be specific to the particular upcoming intersection in question, and different threshold distances can be applied for different intersections. In some implementations, the threshold distance for the particular upcoming intersection in question can depend on current and/or historical traffic conditions of that intersection. In some implementations, current traffic conditions of the intersection can be determined based on traffic condition data received via one or more vehicle-to-vehicle (V2V)/vehicle-to-infrastructure (V2X) links. In some implementations, such traffic condition data can also be accumulated and used to determine historical traffic conditions of the intersection. In some implementations, historical traffic conditions of the intersection can also/alternatively be determined by a remote server, which can determine those historical traffic conditions based on accumulated feedback/data from vehicles and/or infrastructure in the vicinity of the intersection regarding traffic conditions of the intersection.

In some implementations, the determination of whether visual confirmation is to be required can also involve consideration of whether traffic conditions and/or traffic signal states at the upcoming intersection, and/or observed movements of known vehicles in neighboring lanes, are consistent with the notion that the radar-detected stationary object is a stopped vehicle of the intersection. In some implementations, knowledge of traffic conditions and/or traffic signal states at the upcoming intersection can be obtained from data provided by leading vehicles and/or traffic signaling infrastructure and estimates of traffic conditions and/or traffic signal states can be determined from historical traffic data. In some implementations, crowdsourced data and/or a priori knowledge regarding structures/locations associated with high rates of erroneous stopped vehicle detection can also be considered.

Figure 4:
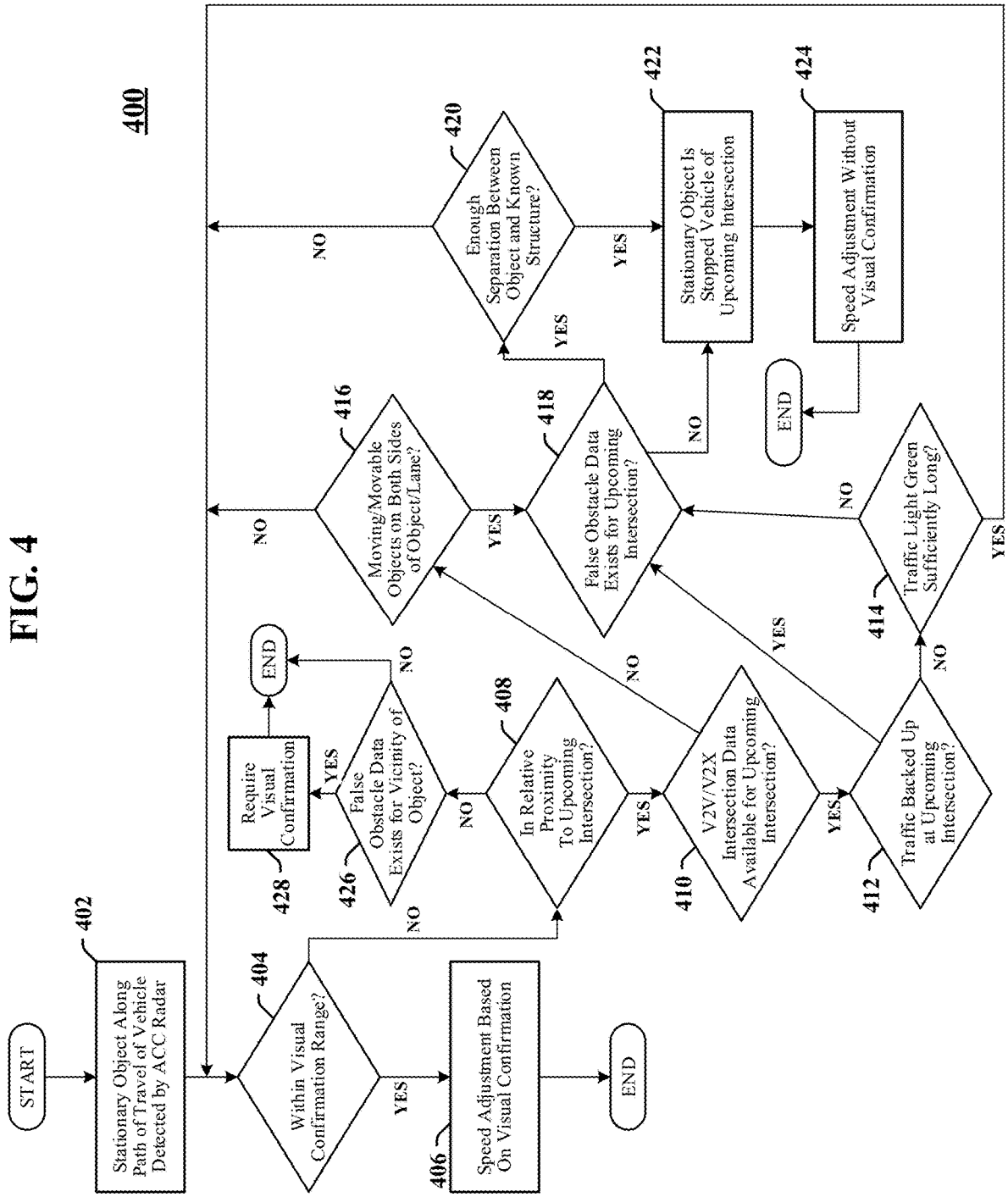
FIG. 4 is a block diagram of a first example process flow.

FIG. 4 is a block diagram of a first example process flow 400 for adaptive cruise control with non-visual confirmation of obstacles. Operations of process flow 400 can be performed by a computer (e.g., computer 110 or an ECU 112) that implements/manages an adaptive cruise control feature of a vehicle (e.g., vehicle 105). According to process flow 400, while an adaptive cruise control (ACC) feature of a vehicle traveling along a roadway is engaged, a stationary object that is located along a path of travel of the vehicle is detected by ACC radar at a block 402. As employed herein in reference to a vehicle traveling along a roadway, the term "path of travel" (alternatively, "travel path") means the collective portion of the roadway that the vehicle is expected to physically occupy as it travels along the roadway. For example, the path of travel of a vehicle traveling along a two-way residential road subject to right-hand traffic (RHT) practices typically consists of the collective portion of upcoming roadway corresponding to the right-hand side of the road. In the case of a vehicle traveling along a roadway featuring lanes, the path of travel of the vehicle typically consists of the collective portion of upcoming roadway corresponding to the travel lane of the vehicle.

At a block 404, it is determined whether the stationary object is located within visual confirmation range of the vehicle. If so, the process 400 passes to a block 406, where the vehicle's speed is adjusted based on visual confirmation that the detected stationary object represents an obstacle in the travel path of the vehicle.

If it is determined at a block 404 that the stationary object is not located within visual confirmation range of the vehicle 105, the process 400 passes to a block 408. At a block 408, it is determined whether the stationary object is located within a threshold distance of an upcoming intersection. If it is determined at a block 408 that the stationary object is located within the threshold distance of an upcoming intersection, the process 400 passes to a block 410. If it is determined at a block 408 that the stationary object is not located within the threshold distance of an upcoming intersection, flow returns to 404. Otherwise, the process 400 passes to a block 410.

At a block 410, it is determined whether vehicle-to-vehicle (V2V)/vehicle-to-infrastructure (V2X) intersection data is available for the upcoming intersection of which the stationary object is located within the threshold distance. As employed herein, the term "V2V/V2X intersection data" means data that is communicated to a host vehicle 105 from one or more other vehicles and/or one or more infrastructure nodes along a path of travel of the vehicle 105, and that describes/characterizes traffic conditions and/or traffic signal states of an intersection (or multiple intersections) in the path of travel of the vehicle 105. If it is determined at a block 410 that such V2V/V2X intersection data is available, the process 400 passes to a block 412. Otherwise, the process 400 passes to a block 416.

At a block 412, it is determined, based on available V2V/V2X intersection data, whether traffic is backed up at the upcoming intersection, such that a line/queue of vehicles waiting to traverse the intersection is present within the travel path of the vehicle 105 in the area where the travel path approaches and meets the intersection. If it is determined at a block 412 that traffic is not backed up at the upcoming intersection, the process 400 passes to a block 414. Otherwise, the process 400 passes to a block 418.

At a block 414, it is determined, based on available V2V/V2X intersection data, whether a traffic light regulating traffic flow through the upcoming intersection along the path of travel of the vehicle 105 has been green for an amount of time sufficiently long to justify a conclusion that the fact that the stationary object remains stationary indicates that the stationary object is not a stopped vehicle waiting to traverse the intersection. If so, flow returns to 404. Otherwise, the process 400 passes to a block 418.

At a block 416, it is determined whether moving (or movable) objects, such as previously-detected other vehicles that the host vehicle 105 continues to track, have been observed on both sides of the stationary object (or the lane in which it resides). If so, the process 400 passes to a block 418. Otherwise, flow returns to 404.

At a block 418, it is determined whether false obstacle data exists for the upcoming intersection. False obstacle data for a given intersection can include crowdsourced false obstacle data. As employed herein, the term "crowdsourced false obstacle data" means data identifying location(s)/structure(s) in the vicinity of an intersection that have been determined, based on reports/data provided by vehicles that have operated with adaptive cruise control engaged while in the vicinity of the intersection, to be associated with increased rates of false obstacle detection. Crowdsourced false obstacle data can be collected and/or aggregated and prepared for download at one or more sources such as the server 145, for example. False obstacle data for a given intersection can additionally or alternatively include data representing a priori knowledge of the presence and location of structure(s) in the vicinity of the intersection that have the potential to induce false obstacle detections. For example, false obstacle data for a given intersection can include map data that indicates the presence of bridge support pillars on the roadway in the vicinity of the intersection.

If it is determined at a block 418 that false obstacle data does not exist for the upcoming intersection, the process 400 passes to a block 422, where it is concluded that the stationary object is a stopped vehicle of the upcoming intersection. As employed herein, the term "stopped vehicle of an intersection" means a vehicle other than the host vehicle 105 that has approached but not yet traversed the intersection, and that is either stationary or moving at a greatly-reduced speed relative to a typical speed at which a vehicle would traverse the intersection if it were clear of other vehicles/obstacles. The conclusion at a block 422 that the stationary object is a stopped vehicle of the upcoming intersection serves as a non-visual confirmation that the stationary object is an obstacle in the path of travel of the host vehicle 105. As such, the process 400 passes from 422 to 424, where the vehicle's speed is adjusted without visual confirmation that the detected stationary object represents an obstacle in the travel path of the vehicle 105.

If it is determined at a block 418 that false obstacle data exists for the upcoming intersection, the process 400 passes to a block 420. At a block 420, it is determined whether enough separation exists between the detected stationary object and a known structure indicated by the false obstacle data to discount the known structure as the source of the radar return associated with the detected stationary object. If not, flow returns to 404. If so, the process 400 passes from 420 to 422 to 424, where the vehicle's speed is adjusted without visual confirmation that the detected stationary object represents an obstacle in the travel path of the vehicle.

If it is determined at a block 408 that the stationary object is not located within the threshold distance of an upcoming intersection, the process 400 passes to a block 426. At a block 426, it is determined whether false obstacle data exists for the vicinity of the object, indicating the presence in the vicinity of the stationary object of a structure known to have the potential to induce false obstacle detections. Such false obstacle data could be crowdsourced false obstacle data, and/or data (e.g., map data) indicating a priori knowledge of the presence of such a structure. If it is determined at a block 426 that no false obstacle data exists for the vicinity of the object, the process 400 ends. If it is determined at a block 426 that false obstacle data exists for the vicinity of the object, the process 400 passes to a block 428. At a block 428, it is determined that visual confirmation is to be required for the stationary object, after which the process 400 ends.

Figure 5:
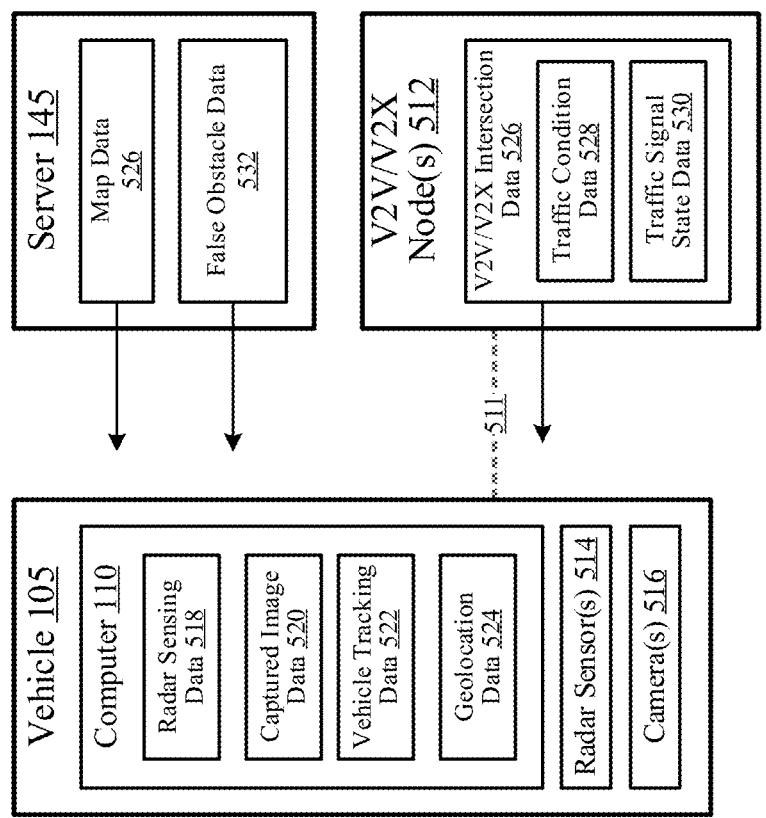
FIG. 5 is a block diagram of a second example system.

FIG. 5 is a block diagram of a second example system 500 for adaptive cruise control with non-visual confirmation of obstacles. System 500 includes vehicle 105 and server 145 of FIG. 1, and one or more V2V/V2X nodes 512. Vehicle 105 can communicate with V2V/V2X nodes 512 via one or more V2V/V2X links 511. V2V/V2X links 511 can be wireless communication links, over which communications can be conducted in accordance with wireless communication protocols supporting vehicle-to-vehicle (V2V) communications and/or vehicle-to-infrastructure (V2X) communications, such as mentioned above. In some implementations, for instance, V2V/V2X links 511 can include cellular V2V (CV2V) and/or cellular V2X (CV2X) links, communications over which can be conducted in accordance with CV2V and/or CV2X protocols. System 500 can also include intermediate elements/nodes enabling communication between vehicle 105 and server 145, notwithstanding the fact that no such elements/nodes are depicted in FIG. 5. For example, in some implementations, system 500 can include network 135 of FIG. 1, which can convey communications between vehicle 105 and server 145.

As illustrated in FIG. 5, vehicle 105 can include computer 110, one or more radar sensors 514, and one or more cameras 516. Computer 110 can implement/manage an adaptive cruise control feature of vehicle 105. While vehicle 105 navigates a roadway (e.g., roadway 301) with its adaptive cruise control feature engaged, radar sensor(s) 514 and camera(s) 516 can provide computer 110 with radar sensing data 518 and captured image data 520, respectively. In conjunction with implementing/managing the adaptive cruise control feature of vehicle 105, computer 110 can access radar sensor data 518 for use in performing radar-based object detection, and can access captured image data 520 for use in performing image-based object detection. Via such radar-based object detection and image-based object detection, computer 110 can detect the presence of objects, such as other vehicles, on the roadway in front of vehicle 105, and can adjust the speed of vehicle 105 to account for the presence of such objects in executing the adaptive cruise control feature.

As vehicle 105 navigates the roadway and computer 110 detects the presence of objects on the roadway, computer 110 may identify some such detected objects as other vehicles in the vicinity of vehicle 105 that are also navigating the roadway. Upon identifying such other vehicles, computer 110 may begin tracking such vehicles so that it does not have to repeat the process of detecting and identifying them when analyzing subsequent radar returns and camera imaging. In this context, computer 110 can generate vehicle tracking data 522. Vehicle tracking data 522 includes data identifying/describing one or more previously detected ("known") vehicles, and can additionally include data indicating past and/or current positions of one or more such vehicles relative to that of vehicle 105.

Upon detecting, based on radar sensing data 518, a stationary object located along the path of travel of vehicle 105 but outside of the visual confirmation range of vehicle 105, computer 110 can determine whether an intersection is present within a threshold distance from the stationary object along the path of travel of vehicle 105. Computer 110 can identify a geolocation of vehicle 105 based on geolocation data 524 (e.g., GPS coordinates) for vehicle 105, and can identify a geolocation of the stationary object based on its detected position relative to vehicle 105 and the geolocation of vehicle 105. Computer 110 can access map data 526, which may be provided by server 145 (as depicted in FIG. 5) and/or may be provisioned to vehicle 105 in another way (e.g., OTA communications, on-site provisioning at a service center, etc.), in order to determine geolocations of intersections along the path of travel of vehicle 105. Computer 110 can compare these geolocations to the identified geolocation of the stationary object in order to determine whether any intersection is present within a threshold distance from the stationary object along the path of travel of the vehicle.

In some implementations, the threshold distance can be specific to the particular upcoming intersection in question, and different threshold distances can be applied for different intersections. In some implementations, the threshold distance for any given intersection in question can depend on current and/or historical traffic conditions of that intersection. For instance, with respect to an intersection at which traffic is currently backed up and/or expected to be backed up over a distance of 500 meters, it may be appropriate to apply a threshold distance of 600 meters. With respect to an intersection at which traffic is currently backed up and/or expected to be backed up over a distance of only 100 meters, however, a 600 meter threshold distance may be too large, and a threshold distance of 150 meters may be appropriate. In some implementations, current traffic conditions of the intersection can be determined based on traffic condition data received via one or more vehicle-to-vehicle (V2V)/vehicle-to-infrastructure (V2X) links (e.g., traffic condition data 528, discussed below). In some implementations, such traffic condition data can also be accumulated and used to determine historical traffic conditions of the intersection. In some implementations, historical traffic conditions of the intersection can also/alternatively be determined by a remote server (e.g., server 145), which can determine those historical traffic conditions based on accumulated feedback/data from vehicles and/or infrastructure in the vicinity of the intersection regarding traffic conditions of the intersection.

Following a determination that an intersection is present within the threshold distance from the stationary object, computer 110 can determine whether the stationary object is a stopped vehicle of the intersection. Responsive to a determination that the stationary object is a stopped vehicle of the intersection, computer 110 can implement a visually-unconfirmed state adjustment for the adaptive cruise control feature of vehicle 105. As employed herein, the term "visually-unconfirmed state adjustment" means an action taken by the adaptive cruise control feature to adapt to the presence of a detected object, without visual confirmation that the detected object represents an obstacle in the travel path of vehicle 105. Actions that can be taken without visual confirmation in conjunction with visually-unconfirmed state adjustments according to various implementations include decelerating/braking, increasing a minimum following distance, or providing other output such as a prompt or alert for presentation to a driver of vehicle 105 (such as on an HMI of vehicle 105). Other actions may additionally or alternatively be taken in conjunction with visually-unconfirmed state adjustments according to various implementations.

According to some implementations, the presence of an intersection within the threshold distance from the stationary object can be treated as confirmation, in and of itself, that the stationary object is a stopped vehicle. In such implementations, the determination that the intersection is present within the threshold distance from the stationary object also constitutes a determination that the stationary object is a stopped vehicle of the intersection. In other implementations, computer 110 may consider one or more other factors in order to determine whether the stationary object is a stopped vehicle of the intersection.

In some implementations, computer 110 can determine whether the stationary object is a stopped vehicle of the intersection based on V2V/V2X intersection data 526 received from V2V/V2X node(s) 512 via V2V/V2X link(s) 511. The V2V/V2X link(s) 511 via which vehicle 105 receives V2V/V2X intersection data 526 can include one or more V2V communication links, one or more V2X communication links, or a combination of both. V2V/V2X intersection data 526 can include traffic condition data 528 for the intersection and/or traffic signal state data 530 for the intersection.

Traffic condition data 528 can include data describing whether a line/queue of vehicles waiting to traverse the intersection is present within the travel path of vehicle 105 in the area where the travel path approaches and meets the intersection. In some implementations, infrastructure at the intersection can be configured to use camera imaging and image-based object detection techniques to identify directions in which vehicles are backing up, and can broadcast traffic condition data 528 that comprises this data. In some implementations, if traffic condition data 528 indicates that traffic is backed up from the intersection to the position of the stationary object (or close to that position), computer 110 can conclude that the stationary object is a stopped vehicle of the intersection. In some implementations, if traffic condition data 528 indicates that the roadway at the intersection is clear in the direction of travel of vehicle 105, computer 110 can conclude that the stationary object is not a stopped vehicle of the intersection.

Traffic signal state data 530 can include data indicating the state (i.e., which light or lights of a traffic signal are or are not illuminated) and/or timing of traffic signals of the intersection affecting the flow of traffic through the intersection in the direction of travel of vehicle 105. For instance, traffic signal state data 530 can include data indicating whether a traffic light controlling traffic flow through the intersection in the direction of travel of vehicle 105 is currently green, yellow, or red, and the timings according to which it will cycle through those states over time. In an example in which traffic signal state data 530 indicates that a traffic light controlling traffic flow through the intersection in the direction of travel of vehicle 105 is currently red, traffic signal state data 530 can also indicate an amount of time (e.g., a number of seconds) remaining until the traffic light changes to green. In some implementations, if traffic signal state data 530 indicates that a traffic light controlling traffic flow through the intersection in the direction of travel of vehicle 105 has been red for a significant amount of time, or has very recently turned green, computer 110 may conclude that the stationary object is a stopped vehicle of the intersection. In some implementations, if traffic signal state data 530 indicates that the traffic light controlling traffic flow through the intersection in the direction of travel of vehicle 105 has been green for a significant amount of time, or has very recently turned yellow or red, computer 110 may conclude that the stationary object is not likely to be a stopped vehicle of the intersection (and therefore that a visual confirmation is still required).

In some implementations, computer 110 can determine whether the stationary object is a stopped vehicle of the intersection based on false obstacle data 532 received from server 145. False obstacle data 532 can include crowd-sourced false obstacle data identifying location(s) and/or structure(s) in the vicinity of the intersection that have been determined, based on reports/data provided by vehicles that have operated with adaptive cruise control engaged while in the vicinity of the intersection, to be associated with increased rates of false obstacle detection. False obstacle data 532 can additionally or alternatively include data representing a priori knowledge of the presence and location of structure(s) in the vicinity of the intersection that have the potential to induce false obstacle detections. In some implementations, data representing a priori knowledge of the presence and location of structure(s) that have the potential to induce false obstacle detections can be incorporated into map data 526. In such implementations, false obstacle data 532 can include such data that is incorporated into map data 526. For example, false obstacle data 532 can include data comprised in map data 526 that indicates the presence of bridge support pillars on the roadway in the vicinity of the intersection.

In some implementations, server 145 can periodically/recurringly analyze crowdsourced false obstacle data that it receives from vehicles in the field in order to identify structures/immovable objects that appear to be inducing false obstacle detections on the part of vehicles that encounter them. In some implementations, if received crowdsourced false obstacle data consistently indicates that a particular structure/immovable object appears to be inducing false obstacle detections, server 145 can determine to categorize that particular structure/immovable object as a known source of false obstacle detections. In such implementations, server 145 can update map data 526 to incorporate data representing a priori knowledge of the presence and location of the structure/immovable object constituting the known source of false obstacle detections.

In some implementations, if false obstacle data 532 identifies a location or structure in the vicinity of the intersection that has been determined to be associated with an increased rate of false obstacle detection, computer 110 can determine whether the stationary object is close enough to that location or structure for the location or structure to be the actual source of the radar return serving as the basis for detection of the stationary object. In some implementations, computer 110 may conduct this determination by determining a distance between the location or structure and the stationary object, and comparing that distance to a predefined threshold value. In some implementations, if the stationary object is location or structure is close enough to the stationary object to be the actual source of the radar return serving as the basis for detection of the stationary object, computer 110 can determine that visual confirmation is to be required for the stationary object.

In some implementations, computer 110 may consult vehicle tracking data 522 in conjunction with determining whether the stationary object is a stopped vehicle of the intersection. In some implementations, computer 110 can cross-reference vehicle tracking data 522 with radar sensing data 518 and/or captured image data 520 to determine whether known vehicles are present in portions of the roadway (e.g., lanes) adjacent to the detected position of the stationary object, and if so, whether they are stationary or moving. In some implementations, responsive to a determination that known vehicles are present in lanes adjacent to the stationary object and are stationary (and are thus stopped vehicles of the intersection), computer 110 can conclude that the stationary object is also a stopped vehicle of the intersection.

Figure 6:
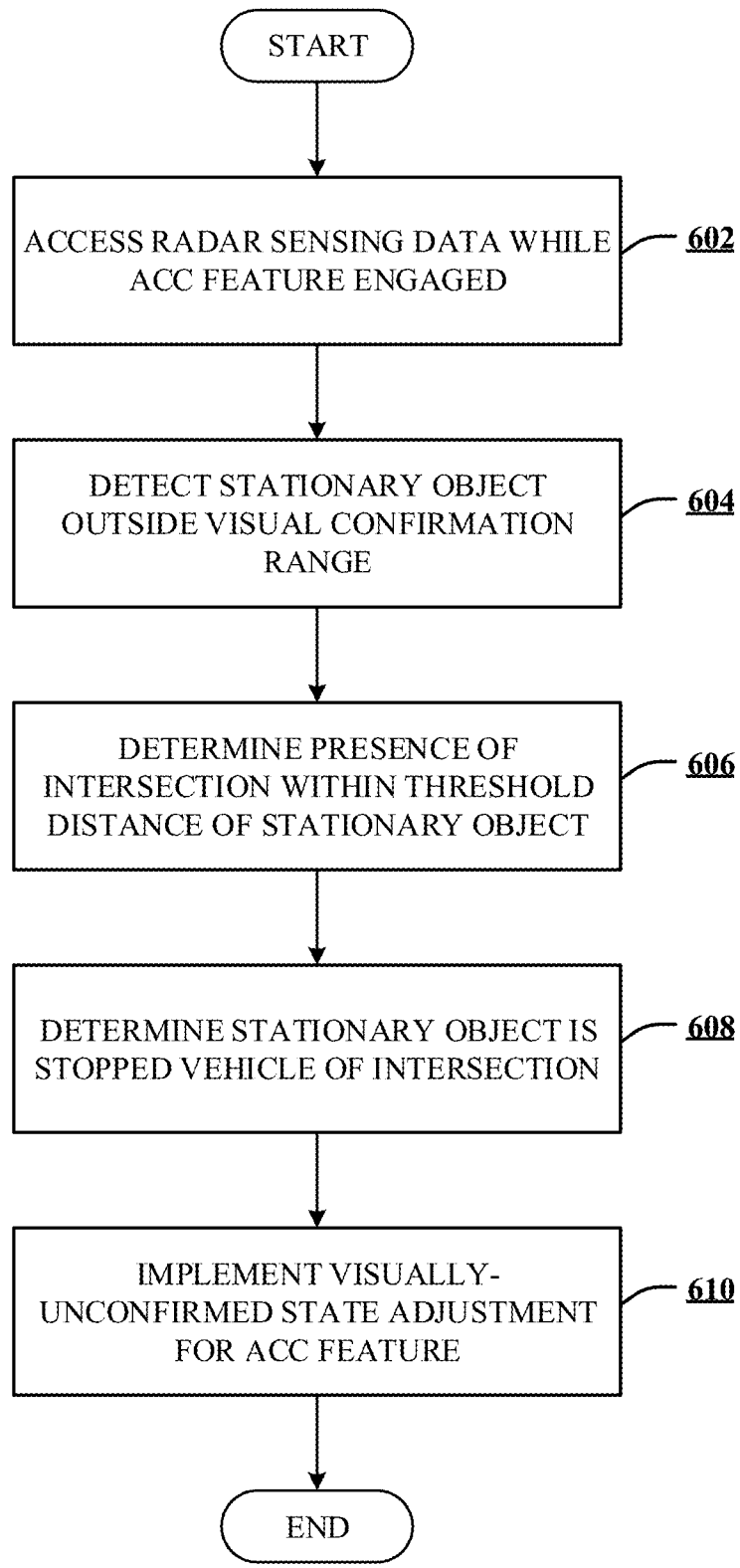
FIG. 6 is a block diagram of a second example process flow.

FIG. 6 is a block diagram of a second example process flow 600 for adaptive cruise control with non-visual confirmation of obstacles. As shown in FIG. 6, radar sensing data may be accessed at block 602 while an adaptive cruise control feature of a vehicle is engaged. For example, computer 110 may access radar sensing data 518 of FIG. 5 while an adaptive cruise control feature of vehicle 105 is engaged. At block 604, a stationary object may be detected that is outside of visual confirmation range of the vehicle. For example, computer 110 may detect a stationary object based on radar sensing data 518, and the detected stationary object may be outside the visual confirmation range 304 of vehicle 105.

At block 606, the presence of an intersection within a threshold distance of the stationary object may be determined. For example, based on geolocation data 524 and map data 526, computer 110 may determine that an intersection is present within a threshold distance from the stationary object along the path of travel of vehicle 105. At block 608, it may be determined that the stationary object is a stopped vehicle of the intersection. For example, computer 110 may determine that a stationary object detected at block 604 based on radar sensing data 518 is a stopped vehicle of the intersection determined at block 606 to be present within the threshold distance from the stationary object along the path of travel of vehicle 105. At block 610, a visually-unconfirmed state adjustment for the adaptive cruise control feature may be implemented. For example, computer 110 may implement a visually-unconfirmed state adjustment for the adaptive cruise control feature of vehicle 105.

Figure 7:
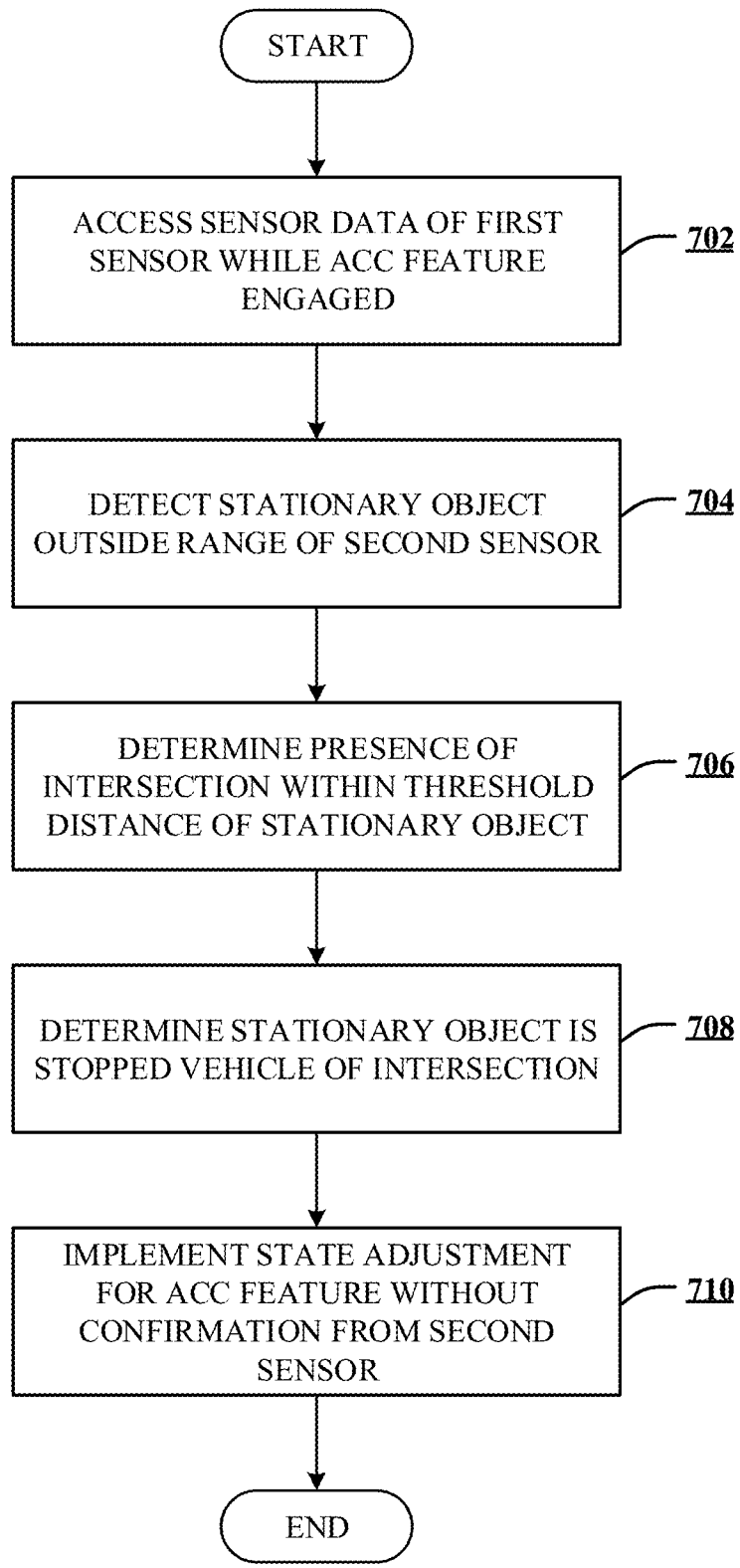
FIG. 7 is a block diagram of a third example process flow.

The preceding discussion focuses on scenarios involving the selective waiver of visual confirmation requirements for radar-detected stationary objects at a vehicle having a radar range that is greater than its visual confirmation range. However, the methods described herein can be applied in other scenarios as well. FIG. 7 is a block diagram of a third example process flow 700 that represents a generalized process that can be applied both in the scenarios focused on above and in other scenarios.

As shown in FIG. 7, sensor data of a first sensor of a vehicle may be accessed at 702 while an adaptive cruise control feature of a vehicle is engaged. In an example implementation, the first sensor can be a camera, and images captured by the camera can be accessed while the adaptive cruise control feature of vehicle 105 is engaged. At 704, based on the sensor data of the first sensor, a stationary object may be detected that is outside of range of a second sensor of the vehicle. For example, based on the images captured by the camera, a stationary object can be detected that is outside range of a radar sensor of vehicle 105.

At 706, the presence of an intersection within a threshold distance of the stationary object can be determined. For example, based on geolocation data 524 and map data 526, computer 110 may determine that an intersection is present within a threshold distance from the stationary object along the path of travel of vehicle 105. At 708, it can be determined that the stationary object is a stopped vehicle of the intersection. For example, computer 110 may determine that a stationary object detected at block 704 is a stopped vehicle of the intersection determined at block 706 to be present within the threshold distance from the stationary object along the path of travel of vehicle 105. At 710, a state adjustment for the adaptive cruise control feature can be implemented without confirmation from the second sensor. For example, computer 110 may implement a state adjustment for the adaptive cruise control feature of vehicle 105 without confirmation from the radar sensor of vehicle 105 that the detected stationary object constitutes an obstacle in the path of travel of vehicle 105.

Figure 8:
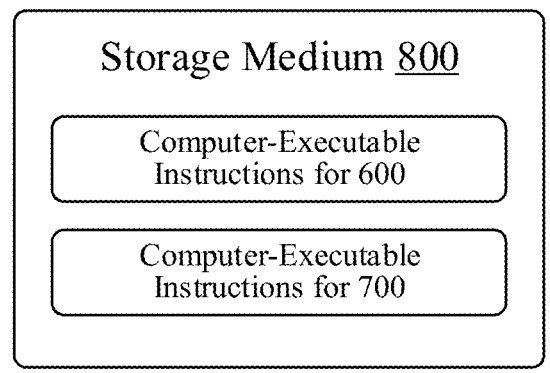
FIG. 8 is a block diagram of an example storage medium.

FIG. 8 is a block diagram of an example storage medium 800. Storage medium 800 may be any non-transitory computer-readable storage medium or machine-readable storage medium, such as an optical, magnetic or semiconductor storage medium. In various implementations, storage medium 800 may be an article of manufacture. In some implementations, storage medium 800 may store computer-executable instructions, such as computer-executable instructions to implement one or both of process flows 600 and 700. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

As used herein, the adverb "substantially" means that a shape, structure, measurement, quantity, time, etc. may deviate from an exact described geometry, distance, measurement, quantity, time, etc., because of imperfections in materials, machining, manufacturing, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
 a computer having a processor and a memory, the memory storing instructions executable by the processor to:
 access sensor data of a first sensor of a vehicle while an adaptive cruise control feature of the vehicle is active and access vehicle tracking data identifying a set of previously-detected vehicles;
 detect, based on the sensor data of the first sensor, a stationary object located along a path of travel of the vehicle, wherein the stationary object is located outside of a range of a second sensor of the vehicle;
 identify, among the set of previously-detected vehicles, based on the sensor data of the first sensor, one or more previously detected vehicles that are present in lanes adjacent to a lane of the stationary object;
 determine whether the one or more previously detected vehicles are stationary;
 determine a presence of an intersection within a threshold distance of the stationary object that is along the path of travel of the vehicle;
 responsive to a determination that the one or more previously detected vehicles are stationary, determine that the stationary object is a stopped vehicle of the intersection; and
 responsive to the determination that the stationary object is the stopped vehicle of the intersection, adjust, by the adaptive cruise control feature, a speed of the vehicle.

2. The system of claim 1, wherein the memory stores instructions executable by the processor to determine the threshold distance based on at least one of:
 current traffic conditions of the intersection; and
 historical traffic conditions of the intersection.

3. The system of claim 1, wherein the memory stores instructions executable by the processor to determine that the stationary object is the stopped vehicle based on received intersection data, wherein the received intersection data includes at least one of:
 intersection data obtained via a wireless vehicle-to-vehicle (V2V) communication link; and
 intersection data obtained via a wireless vehicle-to-infrastructure (V2X) communication link.

4. The system of claim 3, wherein the received intersection data includes at least one of:
 traffic condition data for the intersection; and
 traffic signal state data for the intersection.

5. The system of claim 1, wherein the memory stores instructions executable by the processor to determine that the stationary object is the stopped vehicle based on crowd-sourced false obstacle data received from a remote server.

6. The system of claim 1, wherein the memory stores instructions executable by the processor to generate an alert for presentation by a human-machine interface (HMI) of the vehicle responsive to the determination that the stationary object is the stopped vehicle.

7. The system of claim 1, wherein the memory stores instructions executable by the processor to apply vehicle braking of the vehicle responsive to the determination that the stationary object is the stopped vehicle.

8. The system of claim 1, wherein the first sensor is a radar sensor and the second sensor is a camera.

9. The system of claim 1, wherein the first sensor is a camera and the second sensor is a radar sensor.

10. The system of claim 1, wherein the memory stores instructions executable by the processor to determine the speed of the vehicle based on detecting the stationary object with the sensor data of the first sensor and determining that the stationary object is outside of the range of the second sensor of the vehicle.

11. A method, comprising:
 accessing sensor data of a first sensor of a vehicle while an adaptive cruise control feature of the vehicle is active and accessing vehicle tracking data identifying a set of previously-detected vehicles;
 detecting, based on the sensor data of the first sensor, a stationary object located along a path of travel of the vehicle, wherein the stationary object is located outside of a range of a second sensor of the vehicle;
 identifying, among the set of previously-detected vehicles, based on the sensor data of the first sensor, one or more previously detected vehicles that are present in lanes adjacent to a lane of the stationary object;

determining whether the one or more previously detected vehicles are stationary;

determining a presence of an intersection within a threshold distance of the stationary object that is along the path of travel of the vehicle;

responsive to a determination that the one or more previously detected vehicles are stationary, determining that the stationary object is a stopped vehicle of the intersection; and responsive to the determination that the stationary object is the stopped vehicle of the intersection, adjusting, by the adaptive cruise control feature, a speed of the vehicle.

12. The method of claim 11, comprising determining the threshold distance based on at least one of:

current traffic conditions of the intersection; and historical traffic conditions of the intersection.

13. The method of claim 11, comprising determining that the stationary object is the stopped vehicle based on received intersection data, wherein the received intersection data includes at least one of:

intersection data obtained via a wireless vehicle-to-vehicle (V2V) communication link; and intersection data obtained via a wireless vehicle-to-infrastructure (V2X) communication link.

14. The method of claim 13, wherein the received intersection data includes at least one of:

traffic condition data for the intersection; and traffic signal state data for the intersection.

15. The method of claim 11, comprising determining that the stationary object is the stopped vehicle based on crowd-sourced false obstacle data received from a remote server.

16. The method of claim 11, comprising generating an alert for presentation by a human-machine interface (HMI) of the vehicle responsive to the determination that the stationary object is the stopped vehicle.

17. The method of claim 11, comprising applying vehicle braking of the vehicle responsive to the determination that the stationary object is the stopped vehicle.

18. The method of claim 11, wherein the first sensor is a radar sensor and the second sensor is a camera.

19. The method of claim 11, wherein the first sensor is a camera and the second sensor is a radar sensor.

20. The method of claim 11, wherein the speed of the vehicle is determined based on detecting the stationary object with the sensor data of the first sensor and determining that the stationary object is outside of the range of the second sensor of the vehicle.

* * * * *